United States Patent
Iguchi (10) Patent No.: US 9,621,744 B2
(45) Date of Patent: Apr. 11, 2017

(54) IMAGE PROCESSING APPARATUS, METHOD OF CONTROLLING THE SAME AND STORAGE MEDIUM

(71) Applicant: CANON KABUSHIKI KAISHA, Tokyo (JP)

(72) Inventor: Junji Iguchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/517,215

(22) Filed: Oct. 17, 2014

(65) Prior Publication Data
US 2015/0116786 A1   Apr. 30, 2015

(30) Foreign Application Priority Data
Oct. 28, 2013 (JP) ................. 2013-223705

(51) Int. Cl.
G06F 3/12 (2006.01)
H04N 1/00 (2006.01)
H04N 1/327 (2006.01)

(52) U.S. Cl.
CPC .......... *H04N 1/0022* (2013.01); *H04N 1/001* (2013.01); *H04N 1/32721* (2013.01)

(58) Field of Classification Search
None
See application file for complete search history.

(56) References Cited

U.S. PATENT DOCUMENTS

| | | | | |
|---|---|---|---|---|
| 5,128,776 A * | 7/1992 | Scorse | ........... | H04L 1/1628 358/453 |
| 5,371,607 A * | 12/1994 | Hannina | ........... | H04L 12/28 358/400 |
| 5,426,513 A * | 6/1995 | Scorse | ........... | H04L 1/1628 358/426.02 |
| 5,446,735 A * | 8/1995 | Tobagi | ........... | H04L 12/44 370/445 |
| 5,673,254 A * | 9/1997 | Crayford | ........... | H04L 47/10 370/231 |
| 5,784,597 A * | 7/1998 | Chiu | ........... | H04J 1/12 370/252 |
| 5,864,554 A * | 1/1999 | Rostoker | ........... | G06F 13/128 348/E5.002 |
| 5,905,870 A * | 5/1999 | Mangin | ........... | H04L 47/10 709/213 |
| 5,936,962 A * | 8/1999 | Haddock et al. | ........... | 370/446 |
| 5,949,799 A * | 9/1999 | Grivna | ........... | H04L 1/1664 370/258 |

(Continued)

FOREIGN PATENT DOCUMENTS

JP     2002-169972 A    6/2002

*Primary Examiner* — Madelein Nguyen
(74) *Attorney, Agent, or Firm* — Fitzpatrick, Cella, Harper & Scinto (57) ABSTRACT

An image processing apparatus determines, when image data of an image read from an original is transmitted to an external unit, whether the transmission is by a first communication method or a second communication method, and controls so that, based on a result of the determination, a transmission interval between a plurality of packets for when the image data is transmitted is longer when the image data is transmitted by the first communication method than when the image data is transmitted by the second communication method.

12 Claims, 6 Drawing Sheets

(56) References Cited

U.S. PATENT DOCUMENTS

| | | | | |
|---|---|---|---|---|
| 5,963,560 A * | 10/1999 | Kalkunte | H04L 12/40143 | 370/448 |
| 5,995,488 A * | 11/1999 | Kalkunte | H04L 12/24 | 370/232 |
| 5,999,538 A * | 12/1999 | Haddock | H04L 12/46 | 370/446 |
| 6,016,401 A * | 1/2000 | Rostoker | G06F 13/128 | 709/250 |
| 6,018,526 A * | 1/2000 | Liu | H04L 63/0236 | 370/401 |
| 6,064,673 A * | 5/2000 | Anderson | H04L 12/413 | 370/389 |
| 6,085,238 A * | 7/2000 | Yuasa | H04L 12/4641 | 370/409 |
| 6,118,761 A * | 9/2000 | Kalkunte | H04L 12/2602 | 370/229 |
| 6,198,722 B1 * | 3/2001 | Bunch | H04L 12/413 | 370/229 |
| 6,215,797 B1 * | 4/2001 | Fellman | H04L 12/417 | 370/419 |
| 6,457,055 B1 * | 9/2002 | Hwong | H04L 12/40136 | 370/242 |
| 6,477,595 B1 * | 11/2002 | Cohen | H04L 12/24 | 379/93.14 |
| 6,480,292 B1 * | 11/2002 | Sugiyama | G06K 15/00 | 358/1.15 |
| 6,636,325 B1 * | 10/2003 | Kurase | G06K 15/00 | 358/1.14 |
| 6,680,940 B1 * | 1/2004 | Lewin | H04L 12/2856 | 370/352 |
| 6,757,367 B1 * | 6/2004 | Nicol | H04B 3/23 | 379/100.01 |
| 6,943,908 B1 * | 9/2005 | Omgba | H04N 1/00108 | 358/1.15 |
| 7,002,941 B1 * | 2/2006 | Treadaway et al. | | 370/338 |
| 7,433,069 B2 * | 10/2008 | Masuda | H04N 21/2381 | 358/1.15 |
| 7,545,542 B2 * | 6/2009 | Oshikiri | G06K 15/00 | 347/115 |
| 8,107,365 B2 * | 1/2012 | Barrass | H04L 12/10 | 370/229 |
| 8,861,940 B2 * | 10/2014 | Sasaki | G11B 27/105 | 345/419 |
| 2001/0002195 A1 * | 5/2001 | Fellman | H04L 12/6418 | 370/420 |
| 2001/0012118 A1 * | 8/2001 | Fukunaga | G06F 3/1204 | 358/1.14 |
| 2001/0043565 A1 * | 11/2001 | Chen | H04L 12/5602 | 370/230 |
| 2001/0050913 A1 * | 12/2001 | Chen | H04L 12/5602 | 370/360 |
| 2002/0027886 A1 * | 3/2002 | Fischer | H04L 1/0003 | 370/255 |
| 2002/0061012 A1 * | 5/2002 | Thi | H04B 3/23 | 370/352 |
| 2002/0105955 A1 * | 8/2002 | Roberts, III | H04B 7/18584 | 370/401 |
| 2003/0103243 A1 * | 6/2003 | Watanabe | H04N 21/2381 | 358/405 |
| 2004/0158713 A1 * | 8/2004 | Aneweer | G05B 23/027 | 713/166 |
| 2004/0160980 A1 * | 8/2004 | Miyoshi | H04L 47/14 | 370/462 |
| 2004/0208158 A1 * | 10/2004 | Fellman | H04L 12/6418 | 370/345 |
| 2004/0264491 A1 * | 12/2004 | Spiekman | H04L 12/6418 | 370/437 |
| 2005/0031097 A1 * | 2/2005 | Rabenko | H04B 3/23 | 379/93.31 |
| 2005/0042999 A1 * | 2/2005 | Rappaport | | 455/307 |
| 2006/0153238 A1 * | 7/2006 | Bar-On | H04L 12/40 | 370/473 |
| 2007/0162946 A1 * | 7/2007 | Geile et al. | | 725/119 |
| 2008/0137855 A1 * | 6/2008 | Enomoto | H04L 63/0428 | 380/255 |
| 2009/0154467 A1 * | 6/2009 | Diab | | 370/395.4 |
| 2009/0213423 A1 * | 8/2009 | Kusakabe | G06F 21/608 | 358/1.15 |
| 2009/0274124 A1 * | 11/2009 | Kato | H04W 72/1289 | 370/336 |
| 2010/0165830 A1 * | 7/2010 | Amir | H04L 45/04 | 370/216 |
| 2010/0191525 A1 * | 7/2010 | Rabenko et al. | | 704/211 |
| 2010/0202767 A1 * | 8/2010 | Shirakawa | G03B 15/05 | 396/56 |
| 2010/0290074 A1 * | 11/2010 | Kuroishi | G03G 15/5004 | 358/1.14 |
| 2011/0116398 A1 * | 5/2011 | Nakahara | H04W 52/0216 | 370/252 |
| 2012/0086979 A1 * | 4/2012 | Nakano | G11C 7/10 | 358/1.15 |
| 2012/0195240 A1 * | 8/2012 | Kim | H04W 52/0216 | 370/311 |
| 2013/0215905 A1 * | 8/2013 | Driscoll | H04L 12/40136 | 370/445 |
| 2014/0140232 A1 * | 5/2014 | Dayanandan | H04L 69/324 | 370/252 |
| 2014/0254417 A1 * | 9/2014 | Richardson | H04L 43/50 | 370/252 |
| 2015/0116786 A1 * | 4/2015 | Iguchi | H04N 1/0022 | 358/405 |
| 2015/0124620 A1 * | 5/2015 | Scheffel | H04L 12/40156 | 370/236 |
| 2015/0189659 A1 * | 7/2015 | Mussot | H04L 47/283 | 370/329 |

* cited by examiner

MANCHESTER ENCODING

FIG. 6

IMAGE PROCESSING APPARATUS, METHOD OF CONTROLLING THE SAME AND STORAGE MEDIUM

BACKGROUND OF THE INVENTION

Field of the Invention

The present invention relates to an image processing apparatus for transmitting image data at a plurality of transmission rates, a method of controlling the same and a storage medium.

Description of the Related Art

In recent years, various terminal apparatuses for performing data communication via a network are being developed, and the diversification and the increase in the number of functions of terminals connected to networks is continuing. For these reasons, it is necessary to reduce the influences of various terminal apparatuses on each other as much as possible. For example, in Japanese Patent Laid-Open No. 2002-169972, a technique is proposed in which in a case where a noise reduction request is included in communication data on a network, operation of another terminal apparatus is stopped, or an operation level is reduced.

However, there is a problem with the above described conventional technique as described below. For example, with the above described conventional technique, even if it is possible to reduce peripheral noise by stopping the operation, or reducing the operation level of connected devices, reducing noise output from a self-apparatus during communication cannot be achieved.

In a case where, in an image processing apparatus, an original is read and raw data is transmitted by 10BASE-T to a PC, noise of the transmission data increases due to the data characteristics. This is caused by communication data taking a clock form, when 10BASE-T is Manchester encoded, and the data is continuous data of "1"s or "0"s. Here continuous data of "1"s occurs when transmitting a white image, and continuous data of "0"s occurs when transmitting a black image. In contrast to this, because in 100BASE-TX, MLT-3 encoding is used, 4B-5B conversion and scramble processing is performed, data randomly becomes "0" or "1" as appropriate, and because the data signal level is low, there is no problem.

Note, a merit of transmitting image data to a PC as raw data is that image data editing on the PC becomes easy. For this reason, user demand for outputting scanned image data as raw data is increasing.

SUMMARY OF THE INVENTION

The present invention enables realization of an arrangement for reducing noise upon transmission by controlling a transmission interval of transmission packets when transmitting scanned image data by a predetermined communication method.

One aspect of the present invention provides an image processing apparatus comprising: a reading unit configured to read an image from an original; a determination unit configured to determine, when image data of the image read by the reading unit is transmitted to an external unit, whether the transmission is by a first communication method or a second communication method different from the first communication method; and a control unit configured to control so that, based on a result of the determination by the determination unit, a transmission interval between a plurality of packets for when the image data is transmitted is longer for the first communication method than for the second communication method.

Another aspect of the present invention provides a method of controlling an image processing apparatus comprising: a reading step of a reading unit reading an image from an original; a determination step of a determination unit determining, when image data of the image read in the reading step is transmitted to an external unit, whether the transmission is by a first communication method or a second communication method different from the first communication method; and a control step of controlling so that, based on a result of the determination in the determination step, a transmission interval between a plurality of packets for when the image data is transmitted is longer for the first communication method than for the second communication method.

Still another aspect of the present invention provides a non-transitory computer-readable storage medium storing a computer program for causing a computer to function as the image processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Image Processing Apparatus Configuration>

Hereinafter, explanation will be given for a first embodiment of the present invention with reference to FIG. 1-FIG. 5. Firstly, explanation will be given for an example configuration of an image processing apparatus 10 in this embodiment with reference to FIG. 1.

Figure 1:
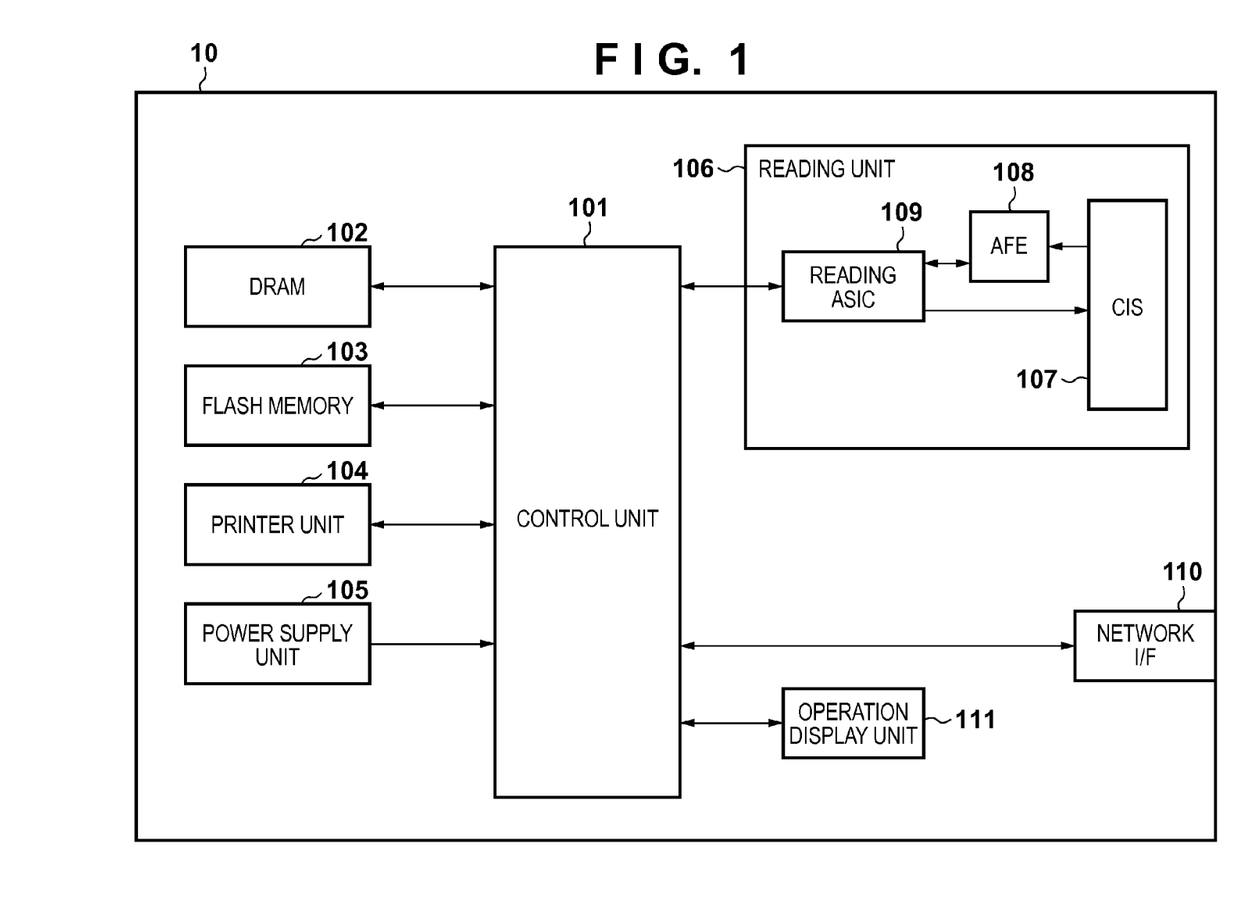
FIG. 1 is a block diagram for showing a configuration of an image processing apparatus in a first embodiment.

The image processing apparatus 10 according to this embodiment corresponds to a LAN (local area network) which has a plurality of transmission rates, such as 10BASE-T or 100BASE-TX, and in particular transmits read in image data to an external unit via 10BASE-T. As shown in FIG. 1, the image processing apparatus 10 comprises a control unit 101, a DRAM 102, a flash memory 103, a printer unit 104, a power supply unit 105, a reading unit 106, a network I/F 110 and an operation display unit 111.

The control unit 101 comprehensively controls the image processing apparatus on the whole. In accordance with this embodiment, the control unit 101 comprises a CPU, an ASIC or the like. The DRAM 102 stores a main body control program, image data or the like. The flash memory 103 stores various parameters of the image processing apparatus 10, a compression program of the image processing apparatus 10, apparatus type information, settings or the like. The reading unit 106 includes a CIS 107, an AFE 108 and a reading ASIC 109.

The printer unit 104 prints image data stored in the DRAM 102 in accordance with the control of the control unit 101. The power supply unit 105 supplies a power-supply voltage to the control unit 101 or the like. The reading unit 106 scans, and converts to digital data, an original, and outputs the data. Here, the CIS 107 is an element for reading an original. This output is converted to digital data by the AFE 108. Converted digital data is sent to the reading ASIC 109, and processing such as a shading is performed upon it, and then it is output to the control unit 101.

The network I/F 110 is an I/F for performing a connection to a network, and performs communication with another terminal apparatus, a hub, a PC, or the like, on a network. The operation display unit 111 outputs user operation input to the control unit 101, and displays based on a control of the control unit 101. Therefore, the operation display unit 111 comprises a display module, which is able to receive a user input, such as a touch panel.

<System Configuration>

Figure 2:
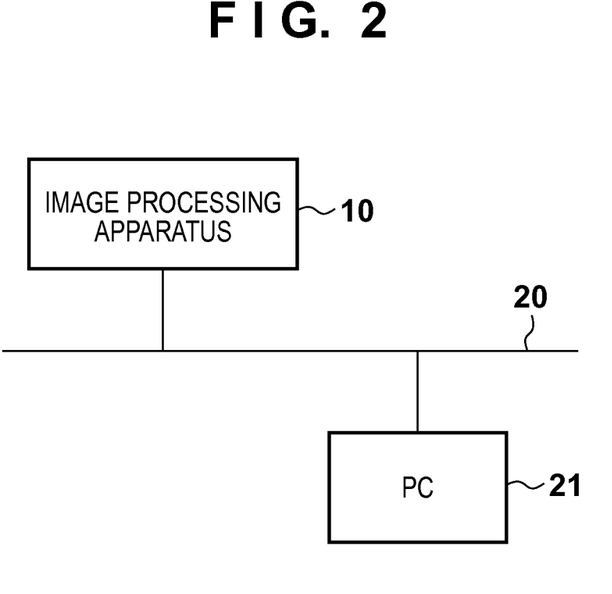
FIG. 2 is a block diagram for showing a configuration of a image forming system in a first embodiment.

Next, with reference to FIG. 2, one example of a connection configuration in an image processing system of this embodiment is illustrated. The image processing apparatus 10 explained in FIG. 1 is connected to the network 20, A PC 21 is connected to the same network 20 and performs communication with the image processing apparatus 10. Note, in order to simplify the explanation, the image forming system, which includes only the image processing apparatus 10 and the PC 21, is illustrated, but the present invention is not limited to the above described embodiment, and can be applied to image forming systems further including other image processing apparatuses, or other PCs, or to image forming systems additionally including other communication apparatuses.

<Processing Procedure>

Next, with reference to FIG. 3, explanation will be given for a processing procedure according to this embodiment. The processing described below is realized by the control unit 101 loading a program from the flash memory 103 into the DRAM 102 and executing it.

In step S301, the control unit 101 determines whether or not an instruction for scanning is received by the network I/F 110 from the PC 21 via the network 20. If the instruction is received, the processing proceeds to step S302, and if the instruction is not received, the determination of step S301 is repeated periodically. In step S302, the control unit 101 determines whether or not a communication method between the image processing apparatus 10 and the PC 21 is 10BASE-T (a first communication method). If a result of the determination is that the communication method is 10BASE-T, the processing proceeds to step S303, if the result is that the communication method is something other than 10BASE-T (100BASE-TX: a second communication method), the processing proceeds to step S308.

In step S303, the control unit 101 causes the reading unit 106 to scan an image for one page of an original stacked on the image processing apparatus 10. Here, the control unit 101 drives the reading unit 106, controls the reading ASIC 109, and activates the CIS 107 and the AFE 108. The image read from the CIS 107 is converted to digital data in the AFE 108, processing such as the shading is executed in the reading ASIC 109, and the data is transmitted to the control unit 101. The control unit 101 stores the data in an image data buffer in the DRAM 102.

Next, in step S304, the control unit 101 sends a default transmission data quantity of data (a DQ) from the image buffer in the DRAM 102 to the network I/F 110, and the processing proceeds to step S305. Here, the DQ indicates default data (a packet). As one example, the data quantity is 16 KB. The network I/F 110 transmits the data to the PC 21 via the network 20. Note, one example of a configuration for a base packet transmitted to the network 20 is shown in FIG. 4. This packet comprises a header portion 40 and a data portion 41. The data portion 41 includes the data quantity designated by the header portion 40.

Figure 3:
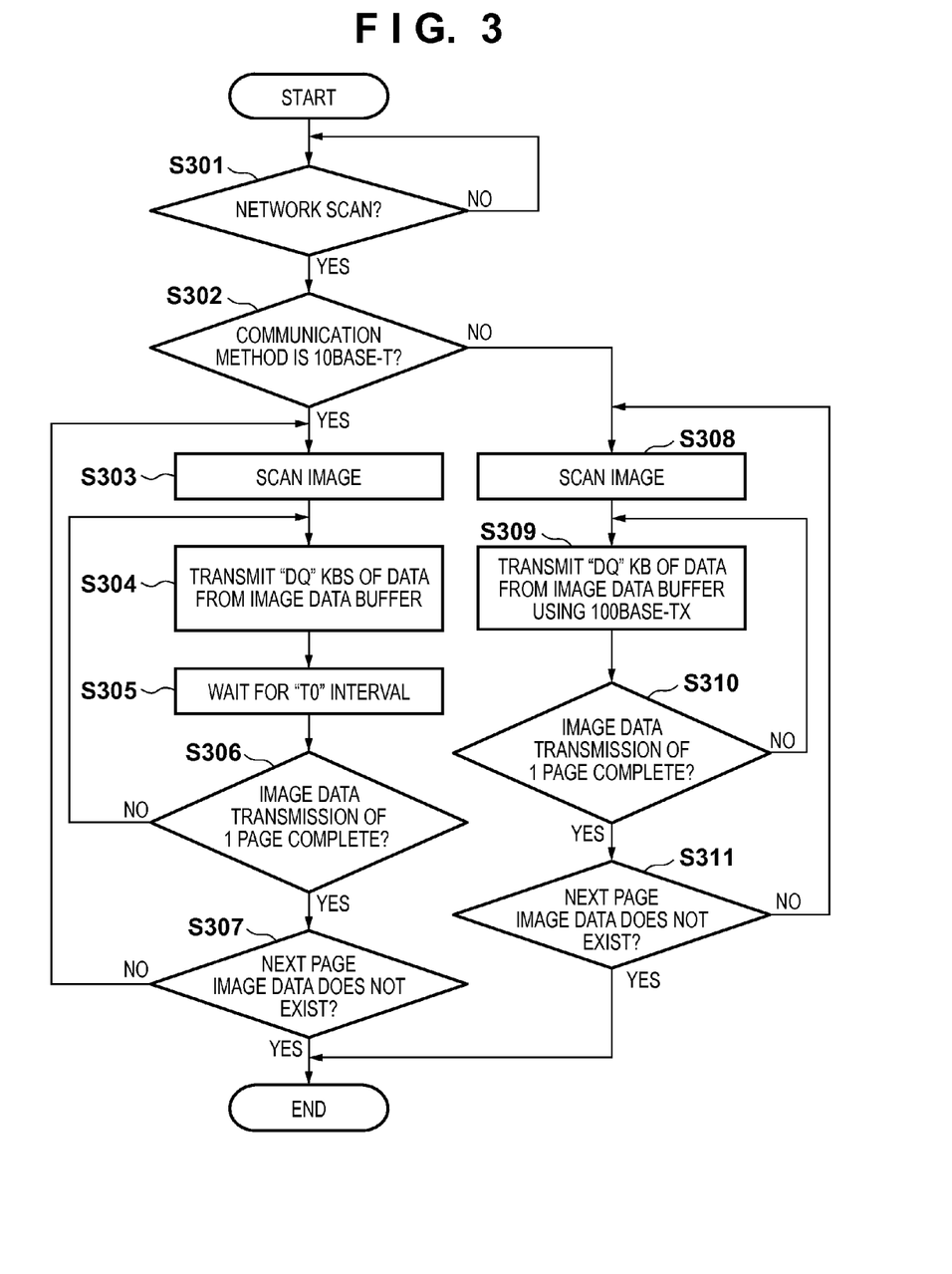
FIG. 3 is a flowchart in the first embodiment.
Figure 4:
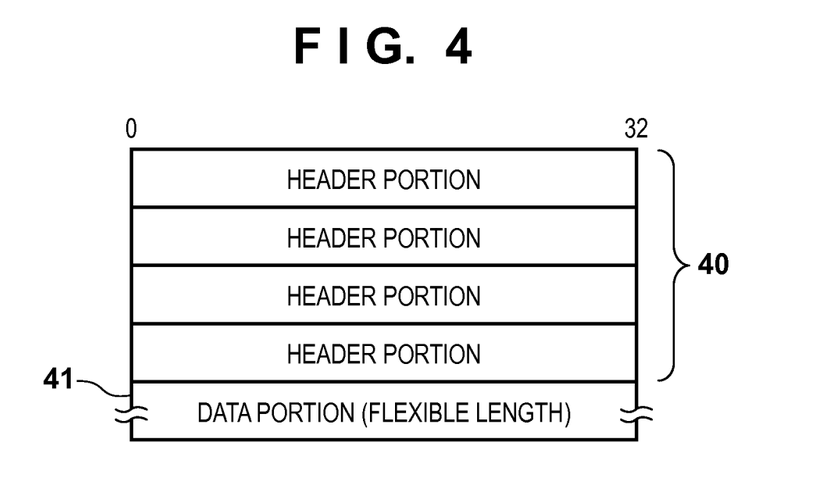
FIG. 4 is a view for showing a packet configuration in the first embodiment.

Explanation now returns to FIG. 3. In step S305, after the control unit 101 has transmitted the default transmission data quantity (a packet), the control unit 101 waits for the elapse of a default interval (T0) which is a predetermined interval. Here, the default interval T0 is, for example, the same interval as an interval required for transmitting a "DQ" data (packet). In other words, here, in order to reduce an increase of noise in transmission data, a transmission interval between a plurality of packets is controlled.

Continuing on, in step S306, the control unit 101 determines whether or not the transmission of image data for the one page has completed. If the transmission of the image data of one page has not completed, the processing returns to step S304, and the remaining default data quantity data is transmitted. On the other hand, if the transmission of the image data of one page has completed, the processing proceeds to step S307 and the control unit 101 determines whether or not there is a next transmission page. If there is a next transmission page, the processing returns to step S303, reading of the next page and similar data transmission to the transmission processing described above are performed. On the other hand, if there is no data of a next transmission page, the processing completes.

If the communication method is determined not to be 10BASE-T in step S302, the control unit 101 causes the reading unit 106 to scan an image of one page of an original stacked on the image processing apparatus 10 in step S308. Here, explanation will be omitted because the reading operation is the same as in step S303.

In step S309, the control unit 101 transmits default transmission data quantity data (DQ) from the image buffer in the DRAM 102 to the PC 21 via the network I/F 110 and the network 20. Here, the data transmission is performed using 100BASE-TX. Accordingly, in case of transmission using 100BASE-TX, wait processing corresponding to step S305 is not performed because the necessity of considering an increase in noise in the transmission data is lower compared with transmission using 10BASE-T. With this, an efficient transmission can be realized in a case of the transmission using 100BASE-TX. Note, their explanation will be omitted because the detail controlling of the data transmission is the same with step S304.

In step S310, the control unit 101 determines whether or not the transmission of image data of one page has completed. If the transmission of the image data of one page has not completed, the processing returns to step S309, and remaining default data quantity data is transmitted. If the transmission of the image data of one page has completed, the processing proceeds to step S311 and the control unit 101 determines whether or not there is next page image data. If there is next page image data, the processing returns to step S308 and reading of the next page and similar data transmission are performed. On the other hand, if there is not the transmission data of next page, the processing completes.

Figure 5:
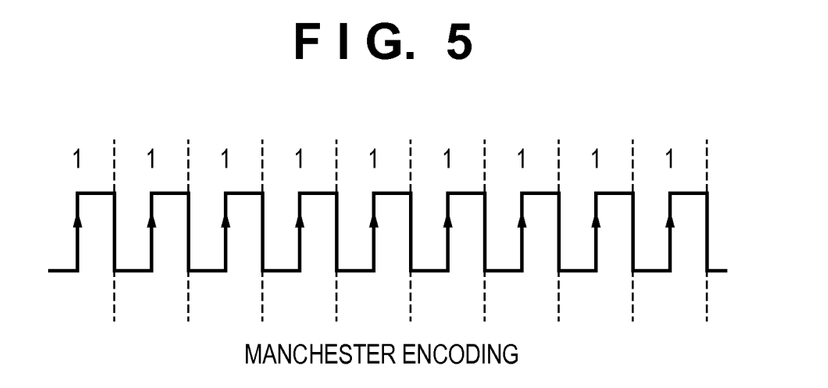
FIG. 5 is a view for showing a state in which transmission data takes a clock form due to Manchester encoding in the first embodiment.

As explained above, upon transmission using 10BASE-T, by controlling (step S305) a transmission interval between each default data (packet), the noise upon signal output can be reduced because control is such that the signal output is not performed until a default interval elapses. Note, a waveform of a clock form of 10 MHz, in a case where "1" is continuous upon transmission using 10BASE-T, is shown in FIG. 5.

Note, the present invention is not limited to the embodiment described above, and it is possible to modify or change within a scope of claim of the present invention. For example, from page-to-page transmission is shown in the above described embodiments, but the same effect can be expected in loading images consecutively and included in the scope of the present invention. Also, it goes without saying that modification of the transmitted image data quantity and modification of the wait interval to be different to the embodiment falls within the scope of the invention.

Meanwhile, in a case of JPEG image transmission, JPEG pixel data is converted into a YCC format, luminance information and hue information are processed in block units and a DCT conversion, or the like, is performed so that consecutive "0"s or "1"s do not continue for long. For this reason, in a case of JPEG, the same wait control as for 10BASE-T may be performed for 100BASE-TX.

<Second Embodiment>

Figure 6:
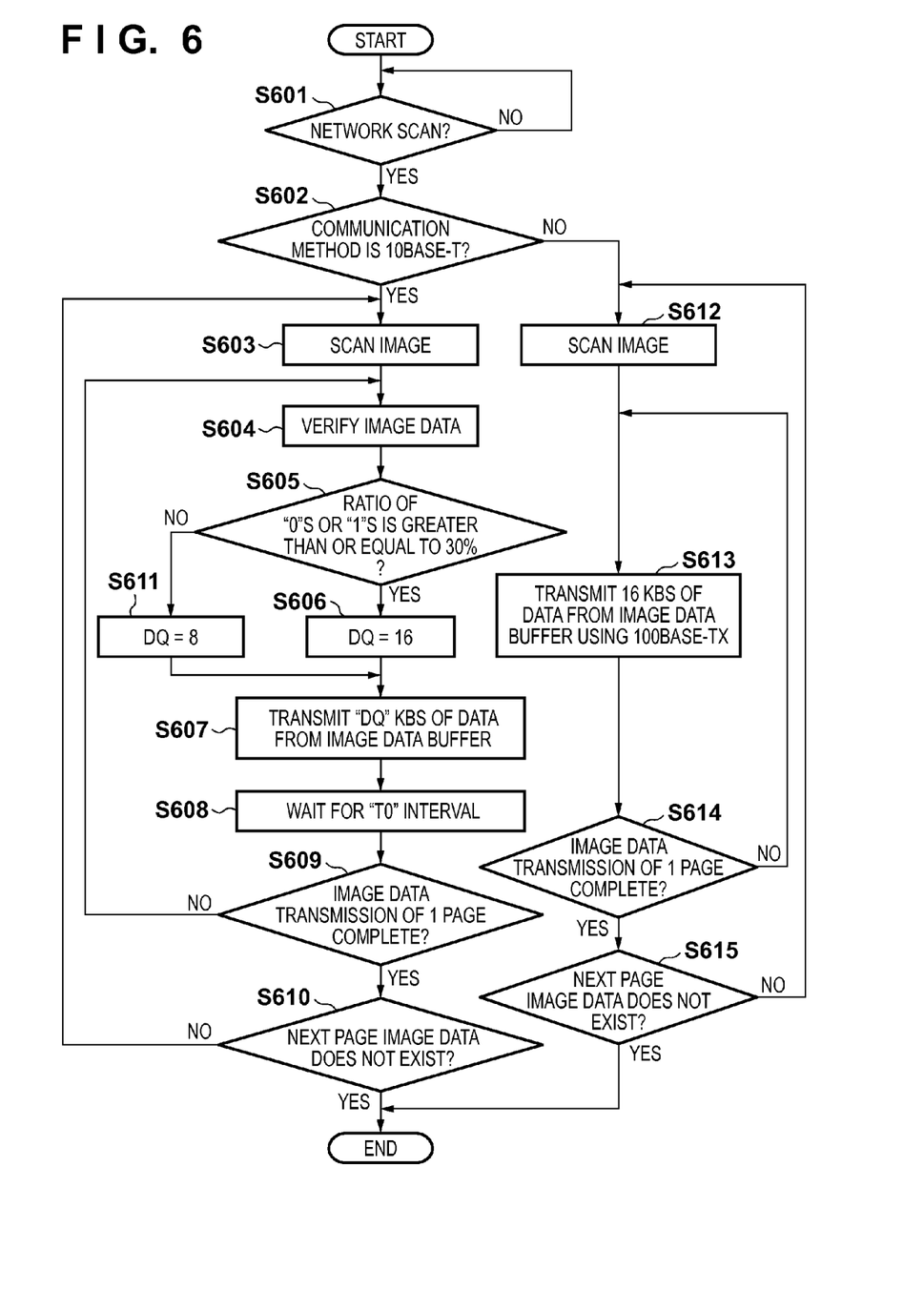
FIG. 6 is a flowchart in a second embodiment.

Next, explanation will be given for the second embodiment of the present invention using FIG. 6. The difference from the first embodiment described above is that image data is validated and the transmission data quantity is changed in accordance with the result of the validation. Here, an explanation is described only for the portions that differ from the first embodiment described above. Hereinafter, with reference to FIG. 6, explanation will be given for a processing procedure according to this embodiment. The processing described below is realized by the control unit 101 loading a program from the flash memory 103 into the DRAM 102 and executing it.

For step S601 through until step S603, explanation is omitted because the operation is the same as the operation in step S301 through step S303 of the first embodiment described above. In step S604, the control unit 101 stores the image data in the DRAM 102, and starts verification of the image data. Here, the verification is the verification of the content of the data portion 41 shown in FIG. 4. In step S605, the control unit 101 verifies the ratio at which "0"s and "1"s (predetermined values) are included in the DRAM 102 image data to be transmit. More specifically, the control unit 101 determines whether or not the ratio of "0"s or "1"s is greater than or equal to 30% (greater than or equal to a predetermined threshold). If the ratio is greater than or equal to 30%, the processing proceeds to step S606, and if the ratio is less than 30% (less than a predetermined threshold), the processing proceeds to step S611.

In step S606, the control unit 101 sets the value of "DQ" which represents the data quantity (packet) to be transmitted to "16" (a first data quantity). After that, the control unit 101 transmits "DQ" KBs of data to the PC 21 via the network I/F 110 and the network 20 in step S607. Then, the control unit 101 waits for the elapse of "T0" interval after the data transmission in step S608. T0 indicates the default interval. For one example, is the same interval as an interval required for "DQ" data transmission. Their explanation will be omitted because step S609 and step S610 are equivalent with step S305 and step S307.

Meanwhile, if the ratio of "0"s or "1"s is less than 30% in step S605, the control unit 101 sets the value of "DQ" which indicates the data quantity (packet) for transmission to be "8" (the second data quantity) in step S611. After that, in step S607, the control unit 101 transmits to the PC 21 via the network I/F 110 and the network 20 with the data quantity being 8 KB. Explanation will be omitted for step S612 through step S615 because these are the same as step S308 through step S311.

As explained above, upon transmission using 10BASE-T, by changing the transmission data quantity based on the content of the image data to be transmitted, unnecessary wait interval can be reduced, and also noise generated in a signal output can be reduced. Here, the ratio is set to 30% and the image data transmission quantity is set to 8 KB and to 16 KB, but the present invention is not limited to this, and other ratios or other data transmission quantities may be set.

<Third Embodiment>

Figure 7:
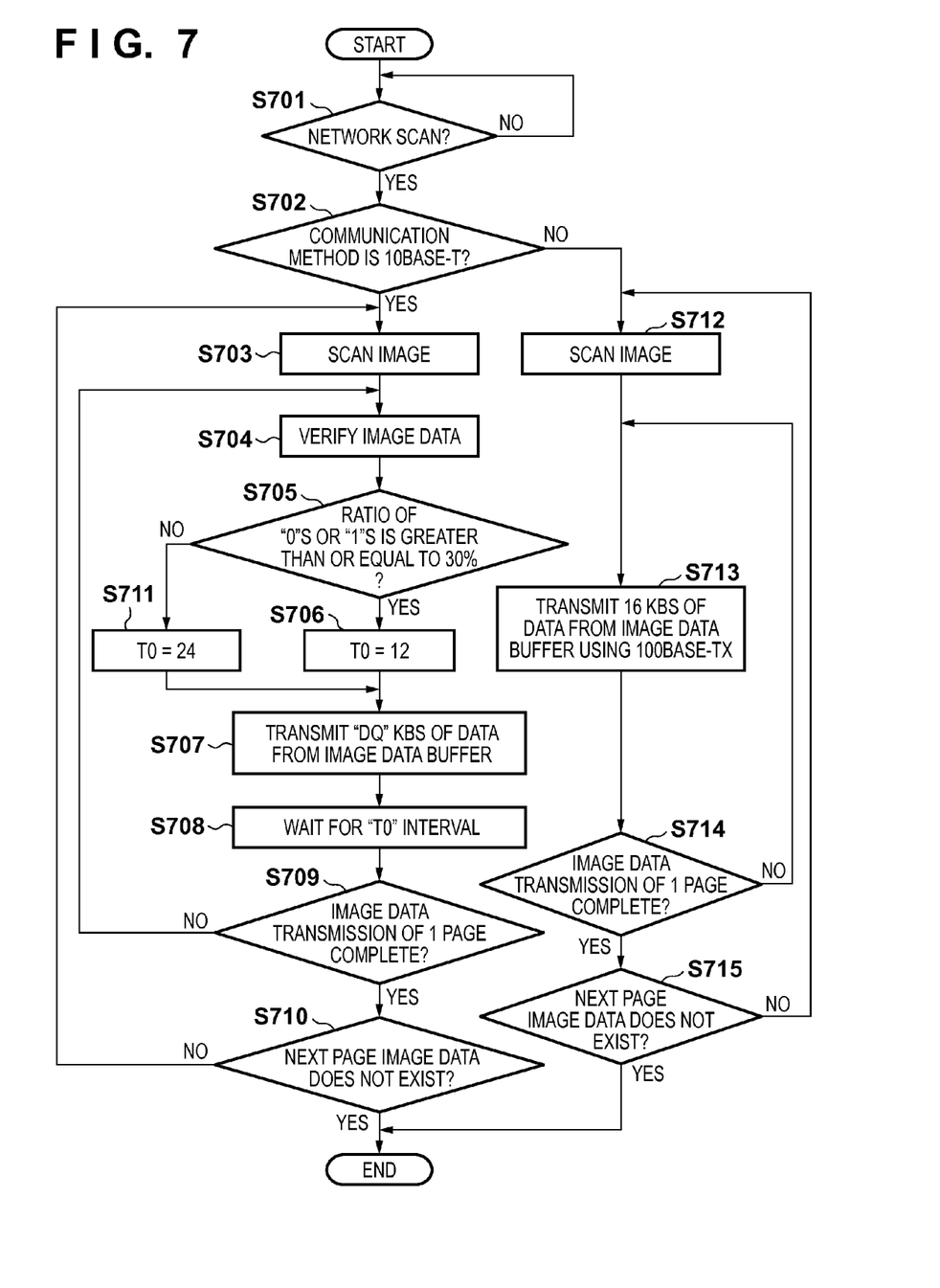
FIG. 7 is a flowchart in a third embodiment.

Next, explanation will be given for a third embodiment of the present invention using FIG. 7. The difference from the embodiments described above is that image data is validated, and the transmission data interval is changed in accordance with the result of the validation. Here, the explanation is given for portions that are different from the first embodiment and the second embodiment described above. Hereinafter, with reference to FIG. 7, explanation will be given for a processing procedure according to this embodiment. The processing described below is realized by the control unit 101 loading a program from the flash memory 103 into the DRAM 102 and executing it.

For step S701 through step S703, explanation is omitted because the operation is the same as the operation in step S301 through step S303 of the first embodiment described above. In step S704, the control unit 101 stores the image data in the DRAM 102, and starts verification of the image data. More specifically, the control unit 101 verifies the ratio of "0"s and "1"s in the image data in the DRAM 102 to be transmitted. In step S705, the control unit 101 determines whether or not the ratio of "0"s or "1"s is greater than or equal to 30%. If the ratio is greater than or equal to 30%, the processing proceeds to step S706, if the ratio is less than 30%, the processing proceeds to step S711.

In step S706, the control unit 101 sets the "T0" value (wait interval), which indicates a wait interval for after data transmission, to "12" (a first interval), for example. The setting has the meaning of 12 ms. Then, the control unit 101 transmits "DQ" KBs of data to the PC 21 via the network I/F 110 and the network 20 in step S707. As one example, "DQ" is set to 16. In step S708, the control unit 101 waits (wait) for the elapse of the "T0" interval, set in step S706 or in step S711, after the data transmission. Their explanation will be omitted because step S709 and step S710 are the same with step S306 and step S307.

If the ratio of "0"s or "1"s is less than 30% in step S705, the control unit 101 configures the "T0" value, which indicates a wait interval after transmission, to "24" (a second interval) for one example. After that, the control unit 101 transmits "DQ" KBs to the PC 21 via the network I/F 110 and the network 20 in step S707. As one example, "DQ" is set to 16 as mentioned previously. Explanation will be omitted for step S712 to step S715 because these are the same as step S308 to step S311.

As explained above, upon transmission using 10BASE-T, by changing the interval between data transmissions based on the content of the image data to be transmitted, the cycle of repetition of data transmission is lengthened in a case where noise easily increases, and the cycle of repetition is shortened when that is not the case. With this, by virtue of this embodiment, an average value of noise that occurs simultaneously to a signal output can be reduced while suppressing a repetition cycle being lengthened pointlessly. Note, here, the ratio is set to 30% and the data transmission interval is set to 12 ms and to 24 ms, but other ratios or data transmission interval times may be set. Also, the data transmission quantity and the data transmission interval may be modified simultaneously based on the content of the image data to be transmitted, in a combination with the second embodiment described above.

<Other Embodiments>

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-223705 filed on Oct. 28, 2013, which is hereby incorporated by reference herein in its entirety.

What is claimed is:

1. A communication apparatus comprising:
    a generating unit configured to generate a packet including image data; and
    a transmission unit configured to perform a first transmission method for transmitting the packet generated by the generating unit using a predetermined coding method, and to perform a second transmission method for transmitting the packet generated by the generating unit without using the predetermined coding method,
    wherein the transmission unit transmits, in the first transmission method, a plurality of packets based on a waiting time between completion of transmission of a packet and start of transmission of a next packet, the waiting time being a period when a packet is not transmitted by the transmission unit,
    wherein the transmission unit transmits, in the second transmission method, a plurality of packets not based on the waiting time, and
    wherein at least one of the generating unit and the transmission unit is implemented by a processor and a memory.

2. The communication apparatus according to claim 1, wherein the transmission unit transmits, in the first transmission method, a packet, and then transmits a next packet after the waiting time has been elapsed.

3. The communication apparatus according to claim 2, wherein the transmission unit transmits, in the second transmission method, a packet, and then transmits a next packet without waiting until the waiting time elapses.

4. The communication apparatus according to claim 1, further comprising
    a verifying unit configured to verify, in the first transmission method, content of the image data; and
    a changing unit configured to change, based on a verification result by the verifying unit, a data quantity for one packet
    wherein at least one of the verifying unit and the changing unit is implemented by a processor and a memory.

5. The communication apparatus according to claim 4, wherein
    the verifying unit verifies a ratio of a predetermined value in the image data, and
    wherein the communication apparatus further comprising
    a setting unit configured to set, if the ratio is greater than or equal to a predetermined threshold, the data quantity for one packet to be a first data quantity, and to set, if the ratio is less than the predetermined threshold, the data quantity for one packet to be a second data quantity less than the first data quantity,
    wherein the setting unit is implemented by a processor and a memory.

6. The communication apparatus according to claim 1, further comprising
    a verifying unit configured to verify, in the first transmission method, content of the image data, wherein
    the transmission unit, based on a result of the verification of the verifying unit, changes the waiting time,
    wherein the verifying unit is implemented by a processor and a memory.

7. The communication apparatus according to claim 6, wherein the predetermined coding method is a Manchester encoding method.

8. The communication apparatus according to claim 1, wherein the first transmission method is 10BASE-T, and the second transmission method is 100BASE-TX.

9. The communication apparatus according to claim 1, further comprising
    a reading unit configured to read an image from an original, and generate the image data.

10. The communication apparatus according to claim 1, wherein image data is raw data.

11. A method of controlling a communication apparatus comprising:
    generating a packet including image data; and
    performing a first transmission method for transmitting the generated packet using a predetermined coding method, and to perform a second transmission method for transmitting the generated packet without using the predetermined coding method,
    wherein a plurality of packets are transmitted based on a waiting time between completion of transmission of a packet and start of transmission of a next packet the first transmission method, the waiting time being a period when a packet is not transmitted by the transmission unit, and
    wherein a plurality of packets are transmitted not based on the waiting time in the second transmission method.

12. A non-transitory computer-readable storage medium storing a computer program for controlling a communication apparatus, the computer program comprising:

a code to generate a packet including image data; and
a code to perform a first transmission method for transmitting the generated packet using a predetermined coding method, and to perform a second transmission method for transmitting the generated packet without using the predetermined coding method, and
wherein a plurality of packets are transmitted based on a waiting time between completion of transmission of a packet and start of transmission of a next packet in the first transmission method, the waiting time being a period when a packet is not transmitted by the transmission unit, and
wherein a plurality of packets are transmitted not based on the waiting time in the second transmission method.

* * * * *